US011042236B2

(12) United States Patent
Feng

(10) Patent No.: US 11,042,236 B2
(45) Date of Patent: Jun. 22, 2021

(54) FLEXIBLE TOUCH DISPLAY PANEL

(71) Applicant: WUHAN CHINA STAR OPTOELECTRONICS SEMICONDUCTOR DISPLAY TECHNOLOGY CO., LTD., Hubei (CN)

(72) Inventor: Xiaoliang Feng, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 16/468,703

(22) PCT Filed: Jan. 9, 2019

(86) PCT No.: PCT/CN2019/070974
§ 371 (c)(1),
(2) Date: Jun. 12, 2019

(87) PCT Pub. No.: WO2020/124707
PCT Pub. Date: Jun. 25, 2020

(65) Prior Publication Data
US 2020/0218385 A1 Jul. 9, 2020

(30) Foreign Application Priority Data
Dec. 17, 2018 (CN) .......................... 201811541287.3

(51) Int. Cl.
G06F 3/041 (2006.01)
G06F 3/047 (2006.01)

(52) U.S. Cl.
CPC ............ G06F 3/0412 (2013.01); G06F 3/047 (2013.01); G06F 2203/04103 (2013.01)

(58) Field of Classification Search
CPC ..................... G06F 3/0412; G06F 2203/04111
See application file for complete search history.

(56) References Cited

U.S. PATENT DOCUMENTS

2011/0134055 A1* 6/2011 Jung ....................... G06F 3/044
345/173
2011/0141037 A1* 6/2011 Hwang ................... G06F 3/044
345/173

(Continued)

Primary Examiner — William Boddie
Assistant Examiner — Andrew B Schnirel
(74) Attorney, Agent, or Firm — Mark M. Friedman

(57) ABSTRACT

A touch display panel is provided and includes a bending section and a non-bending section connecting to two sides of the bending section, the bending section includes a bending centerline; the touch display panel includes a plurality of first metal lines and a plurality of second metal lines in the bending section and the non-bending section; each of the first metal lines is parallel to the bending centerline; each of the second metal lines includes a plurality of second metal line segments spaced apart from each other, each of the second metal line segments is perpendicularly connected to one of the first metal lines; the first metal lines and the second metal lines form a grid-shaped first metal layer; the touch display panel further comprises an organic layer and a plurality of third metal lines in the bending section, the organic layer is disposed on the first metal layer.

10 Claims, 6 Drawing Sheets

(56) References Cited

U.S. PATENT DOCUMENTS

| | | | |
|---|---|---|---|
| 2011/0227839 A1* | 9/2011 | Rho | G06F 3/044 |
| | | | 345/173 |
| 2012/0105343 A1* | 5/2012 | Lee | G06F 3/044 |
| | | | 345/173 |
| 2014/0071065 A1* | 3/2014 | Kung | G06F 3/044 |
| | | | 345/173 |
| 2014/0168138 A1* | 6/2014 | Kuo | G06F 3/044 |
| | | | 345/174 |
| 2017/0147114 A1* | 5/2017 | Dong | G06F 3/044 |
| 2019/0179441 A1* | 6/2019 | Moon | G06F 3/0443 |
| 2020/0026382 A1* | 1/2020 | Zhang | G06F 3/0443 |
| 2020/0133435 A1* | 4/2020 | Liu | G06F 3/0443 |

\* cited by examiner

FLEXIBLE TOUCH DISPLAY PANEL

FIELD OF INVENTION

The present disclosure relates to a touch display panel.

BACKGROUND OF INVENTION

Touch panels have been widely used as new input devices in the field of touch display technologies. As the display technologies advance, people desire for larger screens and convenience in carrying, but there is a contradiction between these two needs. Therefore, the appearance of bendable display panels can better solve this problem: an expansion mode can be used for entertainment, a folding mode can be used for communication and carrying, and the application and development of this technology have gradually permeated the mainstream display field.

Existing bendable touch devices connect touch electrodes with metal lines at one or several fixed bending positions, so that the touch devices can only be bent at a fixed position, and if a touch electrode is bent, once a fissure is appeared in the touch electrode, the fissure tends to spread to the entire electrode, causing a touch malfunction.

Technical Problems

The object of the present disclosure is to provide a touch display panel, which can effectively solve the technical problem that the display screens are too large and inconvenient to carry, and the touch electrode at a bending section is prone to breaking when bent.

SUMMARY OF INVENTION

To solve the above technical problems, the present disclosure provides a touch display panel, comprising:

a bending section having a bending centerline; and a non-bending section connecting to two sides of the bending section; wherein the touch display panel comprises a plurality of first metal lines and a plurality of second metal lines in the bending section and the non-bending section; each of the first metal lines is parallel to the bending centerline; each of the second metal lines comprises a plurality of second metal line segments spaced apart from each other, each of the second metal line segments is perpendicularly connected to one of the first metal lines; the first metal lines and the second metal lines form a grid-shaped first metal layer; in the bending section, the touch display panel further comprises an organic layer and a plurality of third metal lines, the organic layer is disposed on the first metal layer; the third metal lines are disposed on the organic layer and perpendicular to the first metal lines; each of the third metal lines corresponds to one of the second metal lines, each of the third metal lines comprises a plurality of third metal line segments spaced apart from each other, the third metal line segments connect to one of the second metal line segments, the adjacent two third metal line segments are connect to the same second metal line segment; and in the bending section and the non-bending section, the touch display panel further comprises a plurality of fourth metal lines, the fourth metal lines are disposed on the organic layer and parallel to the bending centerline, and at least one of the fourth metal lines is correspondingly connected to at least one of the first metal lines which is insulated from the third metal lines.

Further, the touch display panel further comprises a substrate; and a plurality of touch sections arranged in an array in the bending section and the non-bending section; wherein each of the touch sections comprises two oppositely disposed first electrode sections and two oppositely disposed second electrode sections; a centerline of the two oppositely disposed first electrode sections and a centerline of the two oppositely disposed second electrode sections intersect each other and form an intersection.

Further, the first metal line extends from one of the first electrode sections of the touch section to another one of the first electrode sections through the intersection; and the second metal line extends from one of the first electrode sections of the touch section to another one of the first electrode sections through the intersection.

Further, in the bending section, the third metal line segment of at least one of the third metal lines and the second metal line segments which are connected to the third metal line segments form a connection line of the second electrode sections, and the connection line of the second electrode sections extends from one of the second electrode sections of the touch section to another one of the second electrode sections through the intersection; and at least one of the fourth metal lines which is insulated from the third metal lines is a bridgewire of the first electrode sections.

Further, a first through hole is disposed in the organic layer and extends through the organic layer, a centerline of the first through hole and a direction of the first metal line form a first angle, the first angle ranges from 40° to 70°, and the third metal line segment connects to the second metal line segment via the corresponding first through hole.

Further, a second through hole is disposed in the organic layer and extends through the organic layer, a centerline of the second through hole and a direction of the first metal line form a second angle, the second angle ranges from 40° to 70°, and the fourth metal line segment connects to the second metal line segment via the corresponding second through hole.

Further, in the bending section, two sides of the third metal line which forms the connection line of the second electrode sections comprise an extension line; the extension line extended from the organic layer to the non-bending section, and the extension line extends to a layer where the first metal lines are located.

Further, at least one of the fourth metal lines which is insulated from the third metal lines is a bridgewire of the first electrode sections of the touch sections in the non-bending section.

Further, the first electrode sections and the second electrode sections in each of the touch sections are diamonds in pattern, the two first electrode sections are oppositely disposed, the two second electrode sections are oppositely disposed, and the touch sections formed by the two first electrode sections and the two second electrode sections are also diamonds in pattern.

Further, the touch display panel comprises a protective layer which is disposed on the third metal lines and the fourth metal lines.

Beneficial Effect

A touch display panel is provided, and as compared to a manufacturing method of conventional touch screen, a manufacturing process of the organic layer of the bending section is increased, and during the manufacturing process of a metal grid of the bending layer, the metal line in a vertical bending direction is formed by intersectionally connecting two layers of metal, thereby enhancing bending ability of the metal.

DESCRIPTION OF DRAWINGS

In order to illustrate technical solutions in the embodiments of the present disclosure more clearly, the accompanying drawings required in the description of the embodiments are introduced briefly hereafter. It is obvious that the accompanying drawings in the following description are merely part of the embodiments of the present disclosure. People with ordinary skills in the art can obtain other drawings without making inventive efforts.

DETAILED DESCRIPTION OF PREFERRED EMBODIMENTS

In the following detailed description, reference is made to the accompanying figures, in which various examples are shown by way of illustration. In this regard, directional terminology mentioned in the present disclosure, such as top, bottom, front, back, left, right, inner, outer, lateral, etc., is used with reference to the orientation of the figures being described. Therefore, the directional terminology is used for purposes of illustration and is not intended to limit the present invention. In the accompanying figures, units with similar structures are indicated by the same reference numbers.

Embodiments of the present disclosure will be described in detail herein with reference to the drawings. The present disclosure may be embodied in many different forms and the present disclosure is not intended to be construed as being limited to the specific embodiments set forth herein. The embodiments of the present disclosure are provided to explain the practical applications of the present disclosure so that those skilled in the art can understand various embodiments of the present disclosure and various modifications suitable for particular intended applications.

Figure 1:
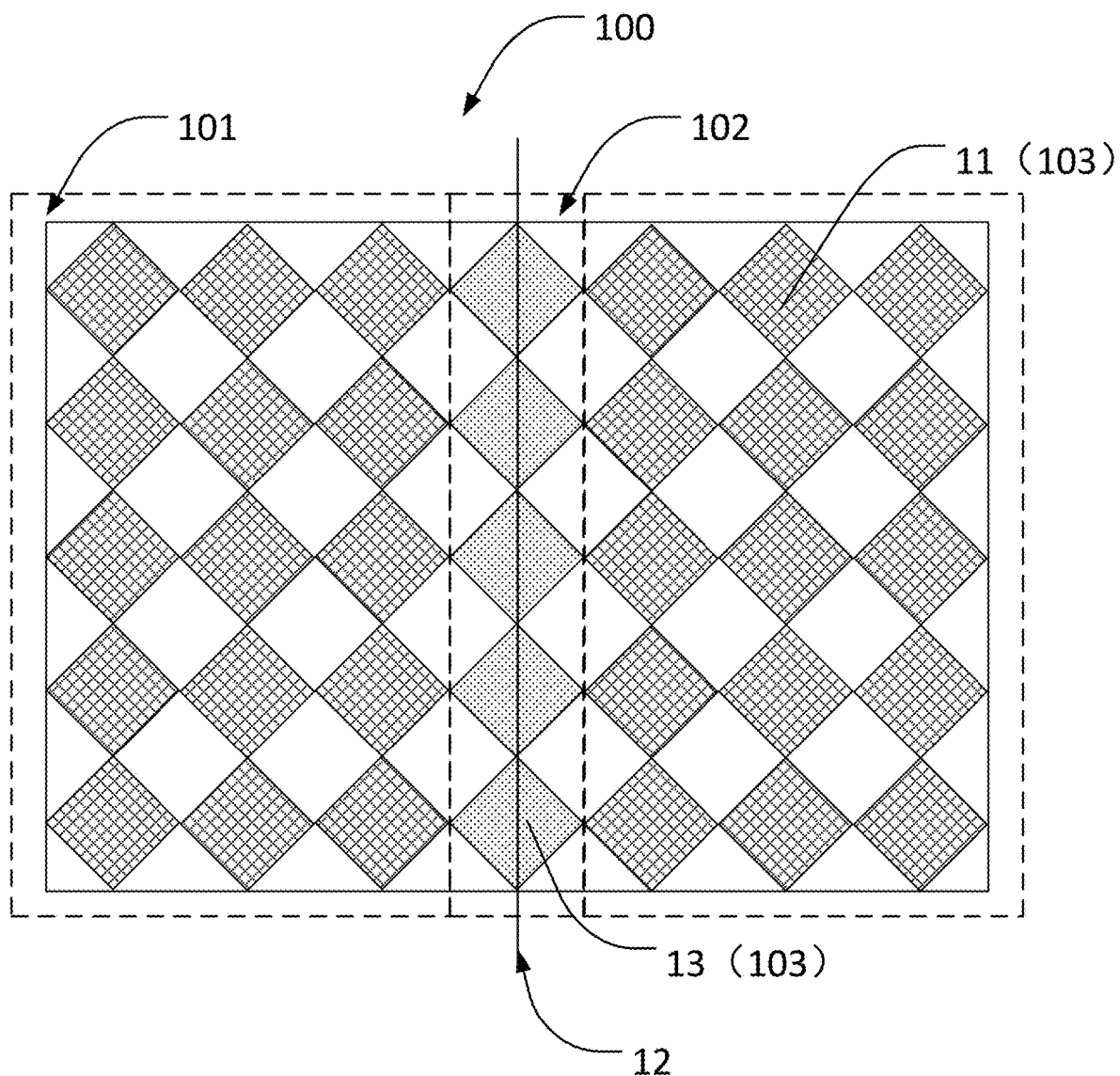
FIG. 1 is a schematic structural view of a touch display panel provided by the present disclosure.

As shown in FIG. 1, an embodiment of the present disclosure provides a touch display panel 100 which comprises a bending section 102 having a bending centerline, and a non-bending section 101 connecting to two sides of the bending section 102.

The touch display panel 100 is mainly formed by a substrate 10 and touch sections 103 which are disposed on the substrate 10. The touch sections are arranged in an array in the bending section and the non-bending section. The touch section 103 includes a first touch section 13 and a second touch section 11. The first touch section 13 is distributed in the bending section, the second touch section 11 is distributed in the non-bending section 101. Generally, the substrate 10 is a thin film transistor (TFT) array substrate.

Figure 2:
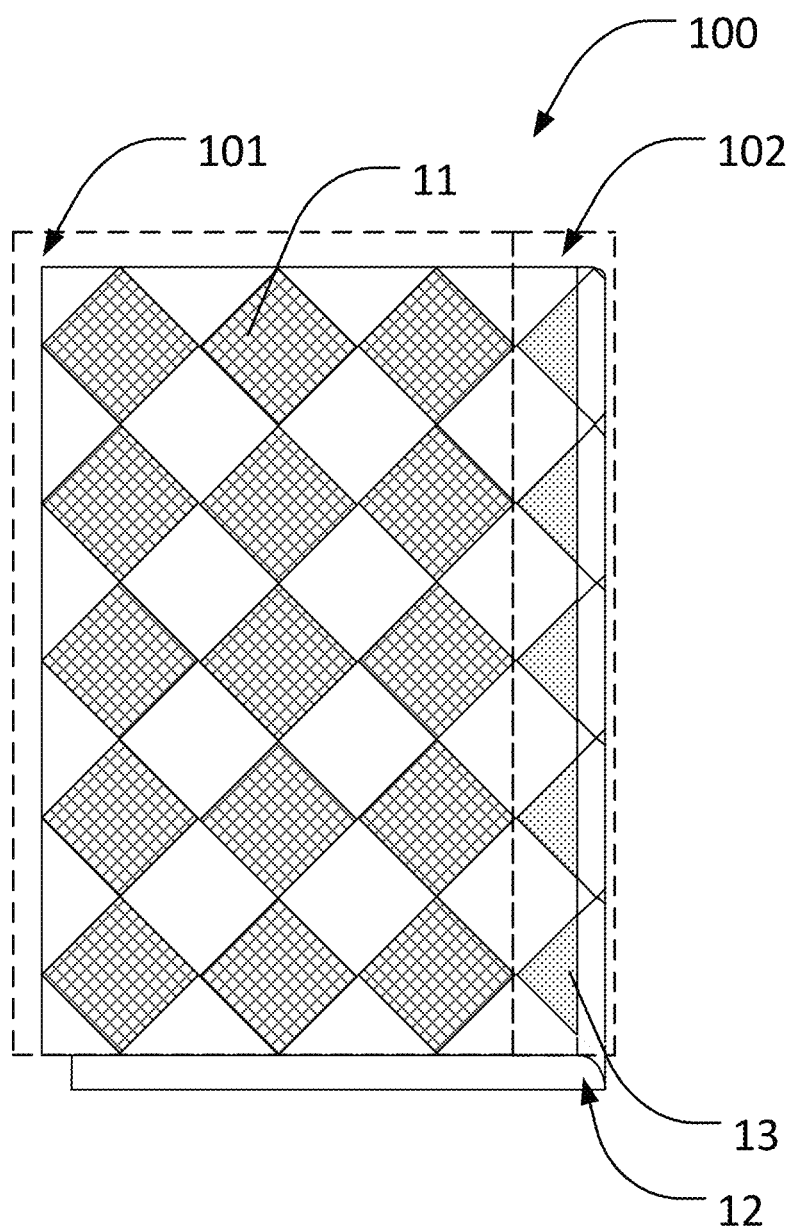
FIG. 2 is a schematic structural view of the touch display panel in a bent state provided by the present disclosure.

As shown in FIG. 2, the touch display panel 100 provided by the present disclosure can be bent along the bending centerline 12 to form a state as shown in FIG. 2. The touch display panel 100 is bent, which is convenient to carry, and can also perform touch and display functions in the state of FIG. 2.

In general, when the touch display panel 100 is in use, the touch display panel can be used under an unfolded condition shown in FIG. 1. The non-bending section 101 is positioned in the middle of the bending section 102 and connects to the non-bending section 101. Furthermore, the touch panel can also be folded and used as shown in FIG. 2. In order to facilitate better bending of the bending section 102, the present disclosure forms an organic layer 20 which is filled with an organic film layer in the bending section 102.

Figure 3:
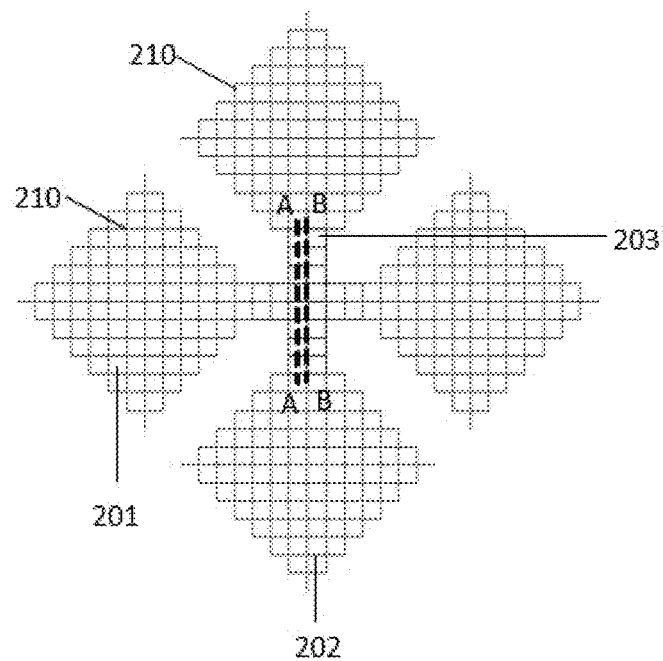
FIG. 3 is a schematic structural view of a second touch section of a non-bending section of the touch display panel provided by the present disclosure.

As shown in FIG. 3, in the non-bending section 101, the touch display panel 100 comprises a plurality of first metal lines 21 and a plurality of second metal lines 22. Each of the first metal lines 21 is parallel to the bending centerline 12. Each of the second metal lines 22 comprises a plurality of second metal line segments 22a spaced apart from each other. Each of the second metal line segments 22a is perpendicularly connected to a first metal line 21. The first metal lines and the second metal lines form a grid-shaped first metal layer (corresponding to a labeled metal grid line 210 of FIG. 3).

The non-bending section 101 comprises a plurality of second touch sections 11. The second touch section 11 also comprises two oppositely disposed first electrode sections 201 and two oppositely disposed second electrode sections 202. A centerline of the two oppositely disposed first electrode sections 201 and a centerline of the two oppositely disposed second electrode sections 202 intersect each other and form an intersection 203. The first electrode section 201 and the second electrode section 202 of the touch section are metal grid lines 210 formed by horizontally crisscross metal lines. The touch sections 103 formed by the two first electrode sections 201 and the two second electrode sections 202 are also diamonds in pattern.

In the non-bending section 101, the touch display panel 100 comprises a first metal layer which is disposed on the substrate 10, an insulating layer 15, and a fourth metal line 18.

The first metal line 21 extends from one of the first electrode sections 201 of the touch section to another one of the first electrode sections 201 through the intersection. The second metal line 22 extends from one of the second electrode sections of the touch section to another one of the second electrode sections through the intersection.

Figure 4:
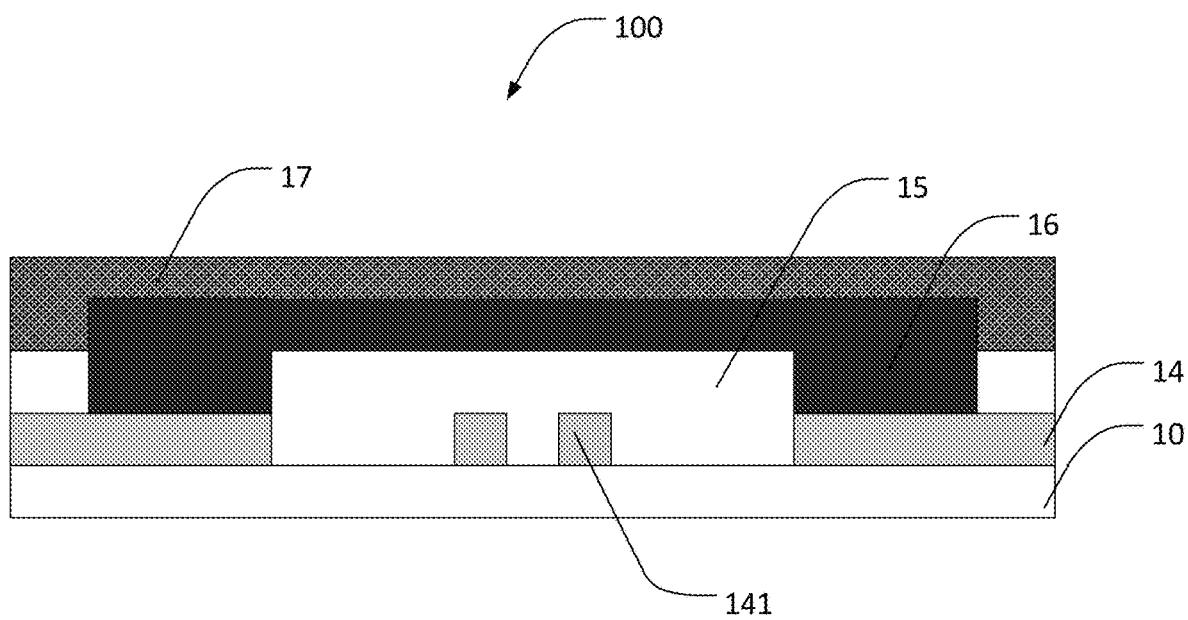
FIG. 4 is a schematic cross-sectional structural view of a connecting line BB of the second touch section provided by the present disclosure.
Figure 5:
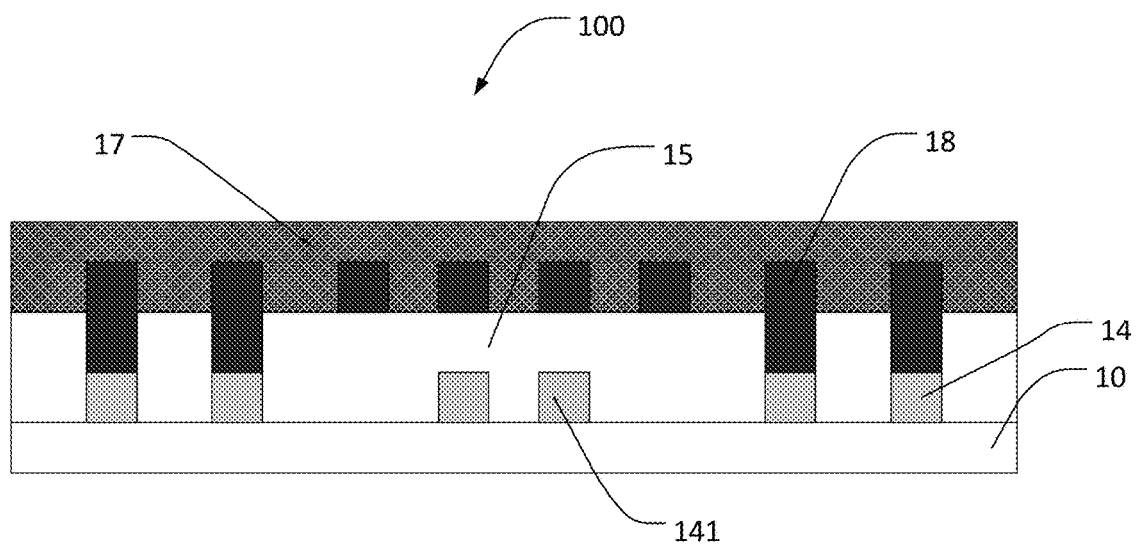
FIG. 5 is a schematic cross-sectional structural view of a connecting line AA of the second touch section provided by the present disclosure.

As shown in FIGS. 4 and 5, in the non-bending section, the first metal layer 14 is disposed on the substrate 10. The insulating layer 15 is disposed on the first metal layer 14 and the substrate. The fourth metal line 18 is partially disposed on the insulating layer 15 and the other portion connects to the first metal layer 14 through the insulating layer 15. The fourth metal line 18 is a bridgewire 203 of a first electrode of the touch section. The first metal layer 14 forms the metal grid line 210 of the touch section in the non-bending section 101.

A portion of the first metal layer 14 serves as a centerline connecting the two first electrode sections 201 of the touch section, as shown by a reference numeral 141 in FIG. 4 or 5. A fifth metal line 16 serves as a center connection line connecting to the second electrode section 202. The insulating layer 15 is disposed between center connection lines of different electrodes, which can prevent the different electrodes from affecting each other's work.

In the non-bending section 101, AA and BB are centerlines connecting the second electrode sections 202. AA is a mutually insulated metal line segment, and does not possess a function of connecting the two second electrode sections 202. The effect of the BB connection line possesses a function of connecting the second electrode sections 202. By connecting the first electrode section and the second electrode section via the centerlines, the complete second touch section 11 is formed, so that the non-bending section 101 can obtain a touch signal and transmit the touch signal.

In the non-bending section 101, a centerline of the first electrode section 201 is in the same layer as the first electrode. A centerline of the second electrode section 202 is connected by disposing a fifth metal line 16 on the second electrode. An insulating layer 15 is disposed between the fifth metal line 16 and the centerline of the first electrode section 201. The first electrode section 201 is configured to transmit a touch signal, and the second electrode section 202 is configured to receive the touch signal.

Touch sensing effect of the touch display panel 100 can be enhanced by arranging the second touch sections 11 on the touch display panel 100.

Figure 6:
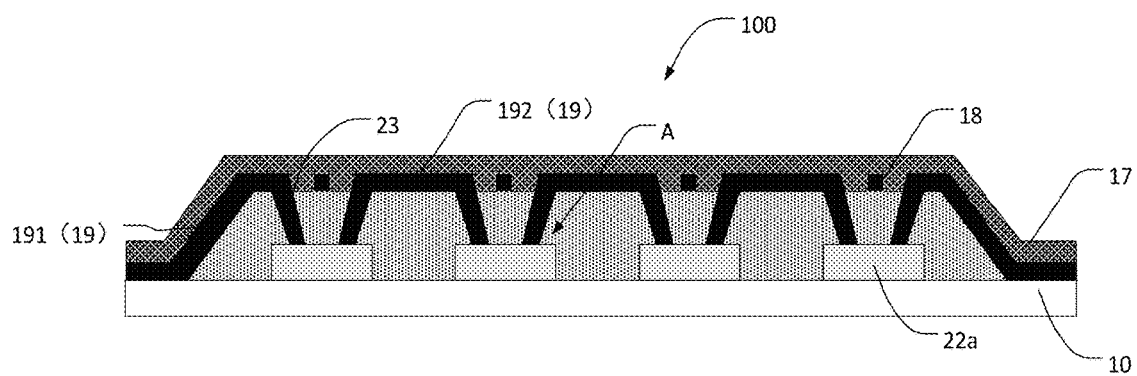
FIG. 6 is a schematic cross-sectional structural view of a bending section of the touch display panel provided by the present disclosure.
Figure 7:
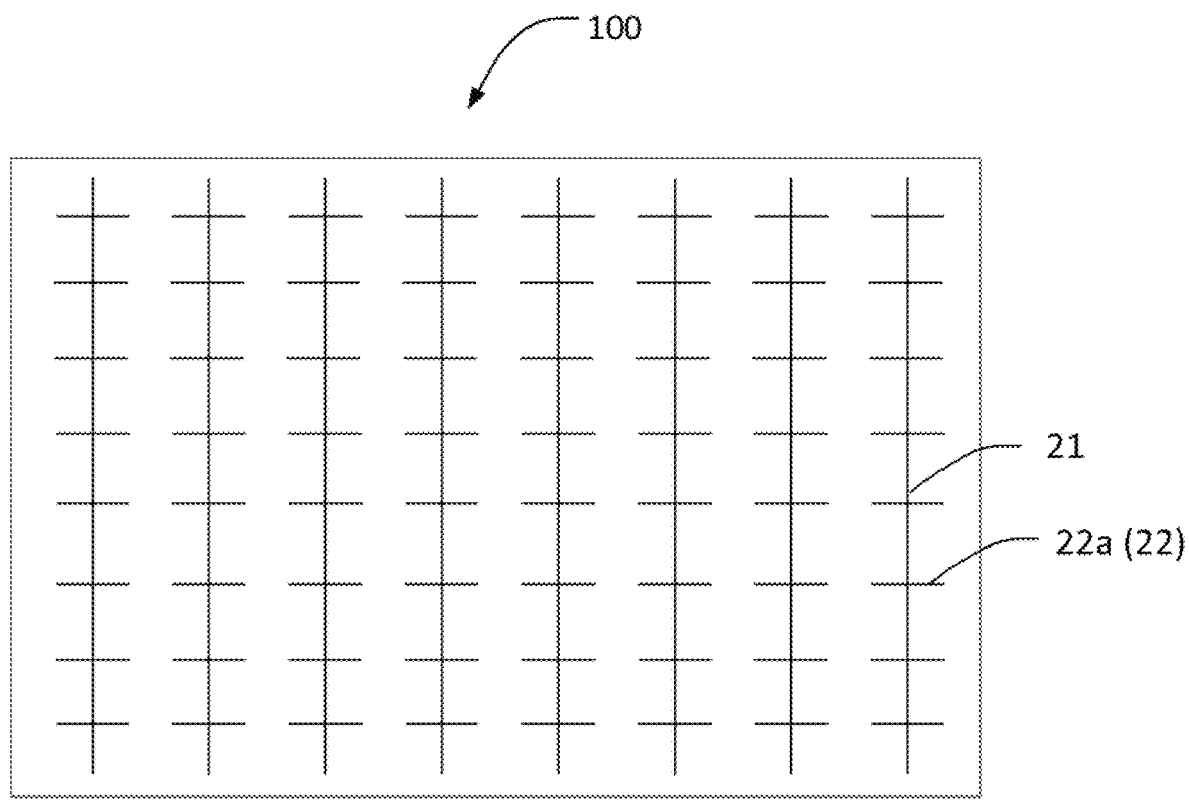
FIG. 7 is a schematic structural view of a first metal line and a second metal line in the bending section of the touch display panel provided by the present disclosure.

The bending section 102 of the present disclosure is further described with reference to FIGS. 6 and 7.

In the bending section 102, the touch display panel 100 includes the first metal lines 21, second metal lines 22, organic layers 20, third metal lines 19, and fourth metal lines 18.

In the bending section 101, the touch display panel 100 includes a plurality of first metal lines 21 and a plurality of second metal lines 22. Each of the first metal lines 21 is parallel to the bending centerline 12. Each of the second metal lines 22 has a plurality of second metal line segments 22a spaced apart from each other, each of the second metal line segments 22a is perpendicularly connected to a first metal line 21a. The first metal lines 21 and the second metal lines 22 form a grid-shaped first metal layer (corresponding to the labeled metal grid line 210 of FIG. 8).

The first metal lines 21 are disposed on the substrate 10 and parallel to the bending centerline 12. The first metal lines 21 are parallel to each other on the substrate 10 and corresponds to a bending region 102, and each of the first metal lines 21 comprises a plurality of first metal line segments 21a.

Each of the second metal lines 22 has the second metal line segments 22a spaced apart from each other, and each of the second metal line segments 22a is perpendicularly connected to the first metal line 21. The first metal line 21 and the second metal line 22 forms a grid-shaped first metal layer (not labeled in the drawings). The grid-shaped first metal layer is used to form a diamond pattern of a touch electrode of the bending section 102 (see the pattern shown in FIG. 8).

The organic layer 20 is disposed on the bending section of the first metal layer 21. Material of the organic layer 20 may be a polyimide film. The organic layer 20 is yellow transparent and relative density of the organic layer 20 is 1.39 to 1.45. Polyimide films have excellent high temperature resistance, electric insulating properties, adhesiveness, radiation resistance, and medium resistance. The polyimide films can be used for a long period of time in the range of temperatures between −269° C. to 280° C. and can be used for a short period of time in a high temperature of 40° C.

The third metal lines 19 are perpendicular to the first metal lines 21, and each of the third metal lines 19 corresponds to one of the second metal lines 22.

Each of the third metal lines 19 has a plurality of third metal line segments 191 spaced apart from each other, and a plurality of extension line segments 192. Each of the third metal line segments 191 is disposed on the organic layer 20, and the third metal line segments 192 are connected to one of the second metal line segments 22a. Two adjacent third metal line segments 191 are connected to the same second metal line segment 22a.

A first through hole 23 is disposed in the organic layer 20 and extends through the organic layer 20, a centerline of the first through hole 23 and a direction of the first metal line 21 form a first angle A, the first angle ranges from 40° to 70°, which is preferably 60° in the present embodiments, and may also be 40°, 50°, or 70°. The third metal line segment 191 connects to the second metal line segment 22a via the corresponding first through hole 23. The metal lines can withstand greater stress with a range of the angle of the first angle A when the bending section is bent.

A portion of the extension line 192 is disposed on the organic layer 20, and one end of the portion of the extension line 192 connects to the first metal layer adjacent to the non-bending section 101 through the organic layer 20, i.e., connects to the second touch section 11 of the non-bending section 101.

The third metal line 19 is disposed on the organic layer 20 and parallel to the bending centerline 12, and a gap is formed between the third metal line 19 and the fourth metal line 18. Each of the third metal lines 19 is correspondingly connected to at least one of the second metal lines 21.

In the bending section 102, the fourth metal lines 18 are disposed on the organic layer 20 and parallel to the bending centerline 12, and at least one of the fourth metal lines is correspondingly connected to at least one of the first metal lines 21. The fourth metal line 18 is used to connect the connection line of the two second electrode sections 202.

A second through hole 24 is disposed in the organic layer 20 and extends through the organic layer 20, a centerline of the second through hole 24 and a direction of the first metal line 21 form a second angle B, the second angle ranges from 40° to 70°, which is preferably 60° in the present embodiments, and may also be 40°, 50°, or 70°. The fourth metal line segment 18 connects to the second metal line segment 22a via the corresponding second through hole 24.

The fourth metal line 18 is used to form a touch electrode pattern or serves as a centerline connecting the first electrode sections 201, and the fifth metal line 16 is used as a centerline connecting the second electrode sections 202.

Figure 8:
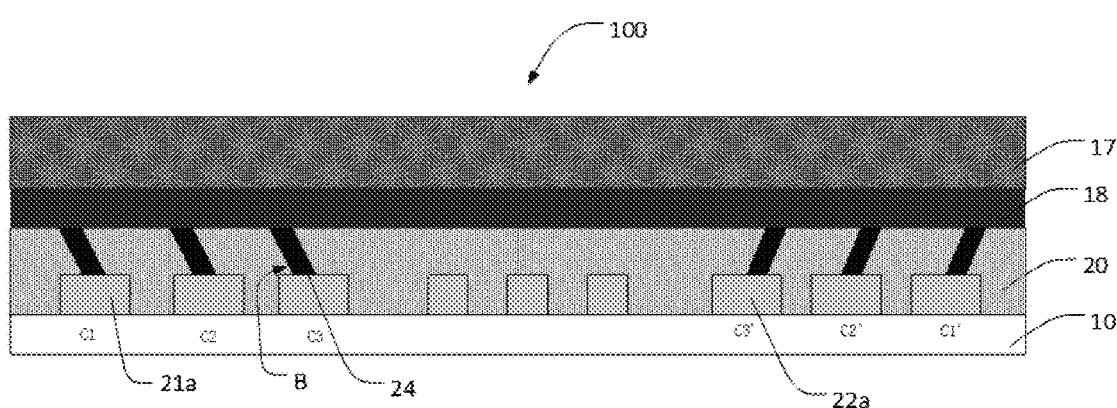
FIG. 8 is a schematic structural diagram of a connection line of a first touch section provided by the present disclosure.

As shown in FIG. 8, the first touch section 13 is disposed on the substrate 10, and each of the touch sections comprises a touch electrode section, the touch electrode section comprises two first electrode sections 201 and two second electrode sections 202, a centerline of the two connection electrode sections 201 is perpendicular to and intersect a centerline of the two second electrode sections 202, the touch electrode sections are insulated from each other. The centerline of the two first electrode sections 201 is parallel to the bending centerline 12.

Figure 9:
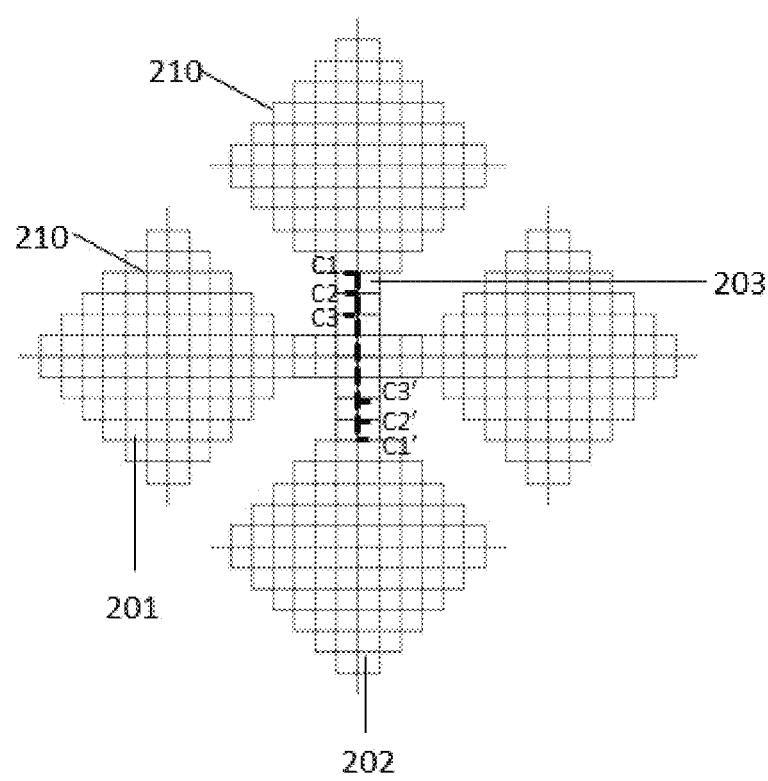
FIG. 9 is a schematic structural diagram of the first touch section in the bending section of the touch display panel provided by the present disclosure.

The fourth metal line 18 is used as a connection line for connecting the second electrode section 202, and the fourth metal line 18 at C1 C1C2C3 to C1'C2'C3' position downwardly connects the first metal line segment 21a of the first metal line 21. C1C2C3-C1'C2'C3' position of FIG. 8 corresponds to labels of FIG. 9. The fourth metal line 18 forms the grid-shaped bridgewire, the pattern of the first electrode section 201 connects the second metal line segment, and it is not necessary to form a bridge structure at the non-bending section 101.

The second metal line segment 22a of the second metal line 22 serves as a connection line connecting the first electrode sections, and the connection line of the first electrode section and the connection line of the second electrode section are insulated from each other, and are not connect to each other.

In the non-bending section 101, the first touch section 13, the first electrode section 201, and the second electrode section 202 are diamonds in pattern, and the first electrode section 201 and the second electrode section 202 may also be square or rectangular.

A structure of the first touch section 13 is different from a structure of the second touch section 11. The metal grid lines 210 of the touch electrode are connected on the same layer in the non-bending section 101. The metal grid lines 210 of the touch electrode in the first touch section 13 are connected by intersecting an upper layer and a low layer, which facilitate the increase of the stress of the bending section 102 when bent and deformed, thereby protecting the first bending section 102 of the first touch section 13. This is a major advancement of the bending section 102 made by the present disclosure, which may better protect the second touch section of the bending section 102.

Further, an electrode of the second touch section 11 of the bending section 102 can be made of a conductive material with higher ductility, so that the electrode section of the bending section 102 can be bent or folded for a long time and can better protect the electrode section of the touch section of the bending section 102.

The touch display panel 100 further comprises a protective layer 17, the protective layer 17 is disposed on the first metal layer 14 and the fourth metal line 18 of the first touch section 13, and the protective layer 17 is disposed on the fourth metal line 18 and the third metal line 19 of the second touch section 11. The protective layer 17 is used for protecting the touch section 103 of the touch panel.

Compared to a manufacturing method of conventional touch screens, a manufacturing process of the organic layer of the bending section is increased, and during the manufacturing process of the metal grid of the bending layer, the metal line in a vertical bending direction is formed by intersectionally connecting two layers of metal, thereby enhancing the bendability of the metal.

The technical scope of the present disclosure is not limited to the contents of the specification, and various modifications and changes can be made to the embodiments without departing from the technical idea of the present disclosure and those modifications and changes should be within the scope of the present disclosure.

The invention claimed is:
1. A touch display panel, comprising:
   a bending section having a bending centerline; and
   a non-bending section electrically connecting to two sides of the bending section;
   wherein the touch display panel comprises a plurality of first metal lines and a plurality of second metal lines in the bending section and the non-bending section;
   each of the first metal lines is parallel to the bending centerline;
   each of the second metal lines comprises a plurality of second metal line segments spaced apart from each other, each of the second metal line segments is perpendicularly electrically connected to one of the first metal line; the first metal lines and the second metal lines form a grid-shaped first metal layer;
   in the bending section, the touch display panel further comprises an organic layer and a plurality of third metal lines, the organic layer is disposed on the first metal layer; the plurality of third metal lines are disposed on the organic layer and perpendicular to the first metal lines; each of the third metal lines corresponds to one of the second metal lines, each of the third metal lines comprises a plurality of third metal line segments spaced apart from each other, the third metal line segments electrically connect to one of the second metal line segments, the adjacent two third metal line segments electrically connect to the same second metal line segment; and
   in the bending section and the non-bending section, the touch display panel further comprises a plurality of fourth metal lines, the fourth metal lines are disposed on the organic layer and parallel to the bending centerline, and at least one of the fourth metal lines is correspondingly electrically connected to at least one of the first metal lines which is insulated from the third metal lines.

2. The touch display panel according to claim 1, wherein the touch display panel further comprises:
   a substrate; and
   a plurality of touch sections arranged in an array in the bending section and the non-bending section;
   wherein each of the touch sections comprises two oppositely disposed first electrode sections and two oppositely disposed second electrode sections; a centerline of the two oppositely disposed first electrode sections and a centerline of the two oppositely disposed second electrode sections intersect each other and form an intersection.

3. The touch display panel according to claim 2, wherein the first metal line extends from one of the first electrode sections of the touch section to another one of the first electrode sections through the intersection; and the second metal line extends from one of the second electrode sections of the touch section to another one of the second electrode sections through the intersection.

4. The touch display panel according to claim 3, wherein in the bending section, the third metal line segment of at least one of the third metal lines and the second metal line segments which are electrically connected to the third metal line segments form a connection line of the second electrode sections, and the connection line of the second electrode sections extends from one of the second electrode sections of the touch section to another one of the second electrode sections through the intersection; and at least one of the fourth metal lines which is insulated from the third metal lines is a bridgewire of the first electrode sections.

5. The touch display panel according to claim 3, wherein a first through hole is disposed in the organic layer and extends through the organic layer, a centerline of the first through hole and a direction of the first metal line form a first angle, the first angle ranges from 40° to 70°, and the third metal line segment electrically connects to the second metal line segment via the corresponding first through hole.

6. The touch display panel according to claim 3, wherein a second through hole is disposed in the organic layer and extends through the organic layer, a centerline of the second through hole and a direction of the first metal line form a second angle, the second angle ranges from 40° to 70°, and the fourth metal line segment electrically connects to the second metal line segment via the corresponding second through hole.

7. The touch display panel according to claim 3, wherein in the bending section, two sides of the third metal line which forms the connection line of the second electrode sections comprise an extension line; the extension line extended from the organic layer to the non-bending section, and the extension line extends to a layer where the first metal lines are located.

8. The touch display panel according to claim 3, wherein at least one of the fourth metal lines which is insulated from the third metal lines is a bridgewire of the first electrode sections of the touch sections in the non-bending section.

9. The touch display panel according to claim 2, wherein the first electrode sections and the second electrode sections in each of the touch sections are diamonds in pattern, the two first electrode sections are oppositely disposed, the two second electrode sections are oppositely disposed, and the touch sections formed by the two first electrode sections and the two second electrode sections are also diamonds in pattern.

10. The touch display panel according to claim 2, wherein the touch display panel comprises a protective layer which is disposed on the third metal lines and the fourth metal lines.

* * * * *